US012235183B2

United States Patent
Cao et al.

(10) Patent No.: US 12,235,183 B2
(45) Date of Patent: Feb. 25, 2025

(54) ELECTRIC MOTOR BRAKING PERFORMANCE TESTING DEVICE

(71) Applicant: DONG-YANG LINIX MECHANICAL & ELECTRICAL CO., LTD., Zhejiang (CN)

(72) Inventors: Shengwei Cao, Dongyang (CN); Shan Du, Dongyang (CN); Bingwen Ren, Dongyang (CN); Zhubing Sun, Dongyang (CN); Ganghao Guo, Dongyang (CN); Xiangjun Xu, Dongyang (CN); Hangdong Tang, Dongyang (CN)

(73) Assignee: ZHEJIANG LINIX MOTOR CO., LTD, Dongyang (CN)

( * ) Notice: Subject to any disclaimer, the term of this patent is extended or adjusted under 35 U.S.C. 154(b) by 213 days.

(21) Appl. No.: 18/025,904

(22) PCT Filed: Dec. 21, 2021

(86) PCT No.: PCT/CN2021/139927
§ 371 (c)(1),
(2) Date: Mar. 12, 2023

(87) PCT Pub. No.: WO2022/170859
PCT Pub. Date: Aug. 18, 2022

(65) Prior Publication Data
US 2023/0349792 A1  Nov. 2, 2023

(30) Foreign Application Priority Data
Jun. 30, 2021 (CN) .................. 202110744762.2

(51) Int. Cl.
*G01M 13/025* (2019.01)

(52) U.S. Cl.
CPC .................. *G01M 13/025* (2013.01)

(58) Field of Classification Search
CPC .................................. G01M 13/025
See application file for complete search history.

(56) References Cited

U.S. PATENT DOCUMENTS

| 1,924,658 A * | 8/1933 | Sanders | G01L 5/286 73/495 |
| 2002/0069697 A1* | 6/2002 | Hofmann | G01L 5/28 73/121 |
| 2012/0222476 A1* | 9/2012 | Kirstatter | G01M 17/0074 73/123 |

(Continued)

*Primary Examiner* — Eric S. McCall
(74) *Attorney, Agent, or Firm* — Jiwen Chen; Joywin IP Law PLLC (57) ABSTRACT

The present invention relates to a motor braking performance testing device, comprising: a motor positioning mechanism, a linkage mechanism, a power supply, a speed detection module, a timing module, a standard data storage module, a data comparison module, a test result output module, and a control module. The power supply, the speed detection module, the timing module, the standard data storage module, the data comparison module and the test result output module are all electrically connected to the control module. The present invention has the advantages that the device can test the braking performance of high-speed motors such as motors of lawn mowers, and make test results more accurate.

11 Claims, 5 Drawing Sheets

(56) References Cited

U.S. PATENT DOCUMENTS

| | | | |
|---|---|---|---|
| 2016/0003316 A1* | 1/2016 | Poelzleithner | G01L 5/28 |
| | | | 324/765.01 |
| 2023/0007842 A1* | 1/2023 | Aitamurto | B66B 5/0037 |
| 2023/0136605 A1* | 5/2023 | Oosthoek | B60T 13/741 |
| | | | 303/3 |

* cited by examiner

ELECTRIC MOTOR BRAKING PERFORMANCE TESTING DEVICE

This is a U.S. national stage application of PCT Application No. PCT/CN2021/139927 under 35 U.S.C. 371, filed Dec. 21, 2021 in Chinese, claiming priority of Chinese Application No. 202110744762.2, filed Jun. 30, 2021, all of which are hereby incorporated by reference.

TECHNICAL FIELD OF THE INVENTION

The present invention relates to an electric motor braking performance testing device.

BACKGROUND OF THE INVENTION

For motors with braking function, such as those of lawn mowers, it is necessary to test their power-off braking performance before delivery. However, at present, braking performance testing devices available commercially are mostly used for testing the performance of brakes, such as the braking performance testing device disclosed in Chinese Utility Model No. 201920720295.8, and no motor braking performance testing device can be directly used for testing the performance of motors.

SUMMARY OF THE INVENTION

An object of the present invention is to provide a motor braking performance detection device which can be used for testing the braking performance of motors, such as motors of lawn mowers.

To achieve the above object, a technical solution employed in the present invention is as follows. A motor braking performance testing device is provided, comprising a motor positioning mechanism configured to position and fix a motor under test; a linkage mechanism which comprises a linkage shaft for linkage with an output shaft of the motor under test and a simulation load for linkage with the linkage shaft; a power supply for powering the motor under test; a speed detection module provided on the linkage shaft for measuring the speed of the output shaft of the motor under test; a timing module configured to count time $T_1$ from the moment when the motor under test receives a braking signal to the moment when the output shaft stops rotating completely; a standard data storage module configured to store standard default time $T_0$ from the moment when the motor under test receives the braking signal to the moment when the output shaft stops rotating completely; a data comparison module configured to compare the time $T_1$ obtained by the timing module with the default time $T_0$; a test result output module which outputs different results based on comparison results of the data comparison module, such as a result that the braking performance of the motor under test is qualified if the $T_1$ is less than the $T_0$, or a result that the braking performance of the motor under test is unqualified; and a control module configured to control the start-up and braking of the motor under test, wherein the power supply, the speed detection module, the timing module, the standard data storage module, the data comparison module and the test result output module are all electrically connected to the control module.

When testing the braking performance of the motor, the motor is placed at the motor positioning mechanism, so that the output shaft of the motor under test is linked with the linkage shaft of the linkage mechanism, and then the motor under test is started up by is the control module, so that the output shaft of the motor under test rotates. After a period of time, the speed of the output shaft of the motor under test reaches the rated speed. In this case, the control module controls the motor under test to be powered off, a built-in brake under test starts to operate, and the speed of the output shaft of the motor under test will continuously decrease to 0 until the output shaft completely stops rotating, the time $T_1$ from the moment when the motor under test receives the braking signal to the moment when the output shaft stops rotating completely is measured by the timing module, and is compared with the standard default time $T_0$ by the data comparison module, and if the $T_1$ is less than the $T_0$, the test result output module outputs a result that the braking performance of the motor is qualified, or a result that the motor braking performance is unqualified.

According to the present invention, brake inertia of the motor can be automatically tested, so as to determine whether the output shaft of the motor under test can stop rotating quickly after power-off braking, thereby testing whether the motor meets the use requirements. The $T_0$ may be set according to the use requirements of the motor under test. The control module may include a programmable logic controller (PLC), and the timing module, the standard data storage module and the test result output module can be set by a conventional PLC.

Preferably, the simulation load comprises a simulation blade fixed to the linkage shaft at the simulation blade's middle, and cover pieces each forming an included angle with the simulation blade are provided on the simulation blade. With the simulation blade, the test scenario of the motor under test of a lawn mower is closer to the use scenario, so as to make test results more accurate.

Preferably, the two cover pieces, each provided on one of front and rear sides of the simulation blade, are located at opposite ends of the simulation blade, respectively, and are provided symmetrically along an axis of the linkage shaft. The wind resistance is improved by the cover pieces to increase the damping when the blade rotates and simulate the scenario when the blade mows grass, so as to make test results more accurate.

Preferably, the speed detection module comprises a rotary encoder provided on the linkage shaft. The speed of the output shaft of the motor is measured by the rotary encoder, so that the control module can determine whether the output shaft of the motor reaches the rated speed or not and whether the output shaft of the motor stops or not.

Preferably, the motor positioning mechanism comprises a fixed mount and a mounting plate, guide grooves for shipper rods to run through are provided on left and right sides of the fixed mount, and a recess groove for receiving the output shaft of the motor under test is provided in the middle of the fixed mount; one end of the shipper rod is linked with an output end of a driver, while the other end is fixed to a pressure plate, and the drivers and the pressure plates are fixed to front and rear sides of the fixed mount, respectively; a pocketing groove for receiving the output shaft of the motor under test is provided in the middle of the mounting plate, the mounting plate is provided with mounting holes which correspond to the motor under test and are fitted to fasteners, and hold-down grooves, which open downward and are wider than the pressure plate, are provided on left and right sides of the mounting plate, respectively.

When in use, the corresponding mounting plate is selected based on different mounting holes at a front end cover of the motor, the motor is fixed to the mounting plate by bolts (fasteners), the two shipper rods are inserted in the mounting plate, and the driver is turned on to make the shipper rods move in their own axial direction, so that the mounting plate is fixed between the pressure plate and the fixed mount. When used in practice, the motor is connected and fixed to the product to be subjected to torque through bolts. According to the present invention, the mounting plate and the motor under test are fixed through a plurality of bolts, which can stably fix the motor under test while ensuring that the mounting plate is stably fixed, and simulate the fixed structure of the motor in use. According to the present invention, the mounting plate is clamped and fixed by the two pressure plates, and a contact surface between the pressure plates and the mounting plate is large, so as to ensure that the mounting plate is stably fixed. The mounting plate is provided with the two hold-down grooves which open downward, so that the mounting plate can be confined transversely and also confined vertically by its own gravity. According to the present invention, the motor under test is positioned and fixed well and thus can be tested stably, so that the motor under test can be tested at higher speed. The driver may be an air cylinder, and the shipper rod is a rod-like piece coaxial or parallel to a piston rod of the air cylinder, or is the piston rod of the air cylinder.

Preferably, the pressure plate is provided with a tapered bulge extending to the fixed mount, and the mounting plate is provided with tapered open grooves fitted to the tapered bulges. The tapered bulge of the pressure plate can extend into the tapered open groove, and a tapered surface of the tapered bulge can be fitted to a groove face of the tapered open groove, so as to further ensure that the mounting plate and the pressure plates are positioned and fixed.

Preferably, locating pieces are provided on a rear side of the fixed mount, a retaining nest running vertically is formed between the locating piece and the fixed mount, and an opening at an upper end of the retaining nest has a width gradually decreasing from top to bottom. The mounting plate is placed under the guidance of the retaining nests, so that the shipper rods are vertically inserted in the mounting plate to facilitate the subsequent compression and positioning of the motor under test.

Preferably, the recess groove has a width gradually increasing from bottom to top, and runs upward through a fixed mount. The arrangement makes it easy for the output shaft of the motor under test to run through the fixed mount, and facilitates the removal and placement of the mounting plate.

Preferably, a bar-type slot extending transversely runs longitudinally through an upper end of the mounting plate and is located in the middle of the mounting plate. The bar-type slot is located in the middle of the mounting plate, which is easy for the operator to hold. In addition, the bar-type slot can be communicated with the recess groove when the mounting plate is in contact with the fixed mount, which facilitates the removal of the mounting plate after the test is completed.

A testing method for the motor braking performance testing device according to any one of claims 1 to 9 is further disclosed in the present invention, comprising following steps of:
S1: placing the motor under test on the testing device, linking the output shaft of the motor under test with the linkage shaft of the linkage mechanism, and starting up the motor under test by the control module;
S2: when the speed of the output shaft of the motor under test reaches a rated speed, sending, by the control module, a braking signal to control the motor to brake, starting up the timing module to count time at the same time; when the output shaft of the motor under test stops rotating completely, stopping the timing module, obtaining, by the timing module, time $T_1$ from the moment when the motor under test receives the braking signal to the moment when the output shaft stops rotating completely, and transmitting the time $T_1$ to the data comparison module;
S3: comparing, by the data comparison module, the time $T_1$ obtained by the timing module with the standard default time $T_0$; and
S4: outputting, by the test result output module, different results based on comparison results of the data comparison module, such as a result that the braking performance of the motor under test is qualified if the $T_1$ is less than the $T_0$, or a result that the braking performance of the motor under test is unqualified.

The present invention has the advantages that the device can test the braking performance of high-speed motors such as motors of lawn mowers, and make test results more accurate.

DETAILED DESCRIPTION OF THE INVENTION

The present invention will be further described as below with reference to the accompanying drawings by embodiments.

As shown in FIGS. 1 to 7, a motor braking performance testing device is provided in the present invention, comprising a motor positioning mechanism 100, and a linkage mechanism 200. The motor positioning mechanism 100 is configured to position and fix a motor 9 under test, and the linkage mechanism 200 comprises a linkage shaft 21 for linkage with an output shaft 91 of the motor 9 under test and a simulation load for linkage with the linkage shaft 21. The device further comprises a power supply for powering the motor 9 under test, a speed detection module for measuring the speed of the output shaft 91 of the motor 9 under test, a timing module configured to count time $T_1$ from the moment when the output shaft 91 of the motor 9 under test receives a braking signal to the moment when the output shaft 91 stops rotating completely, a standard data storage module configured to store standard default time $T_0$ from the moment when the output shaft 91 of the motor 9 under test receives the braking signal to the moment when the output shaft 91 stops rotating completely, a data comparison module configured to compare the time $T_1$ obtained by the timing module with the default time $T_0$, a test result output module configured to output results, and a control module configured to control the start-up and braking of the motor 9 under test. The power supply, the speed detection module, the timing module, the standard data storage module, the data comparison module and the test result output module are all electrically connected to the control module.

Figure 2:
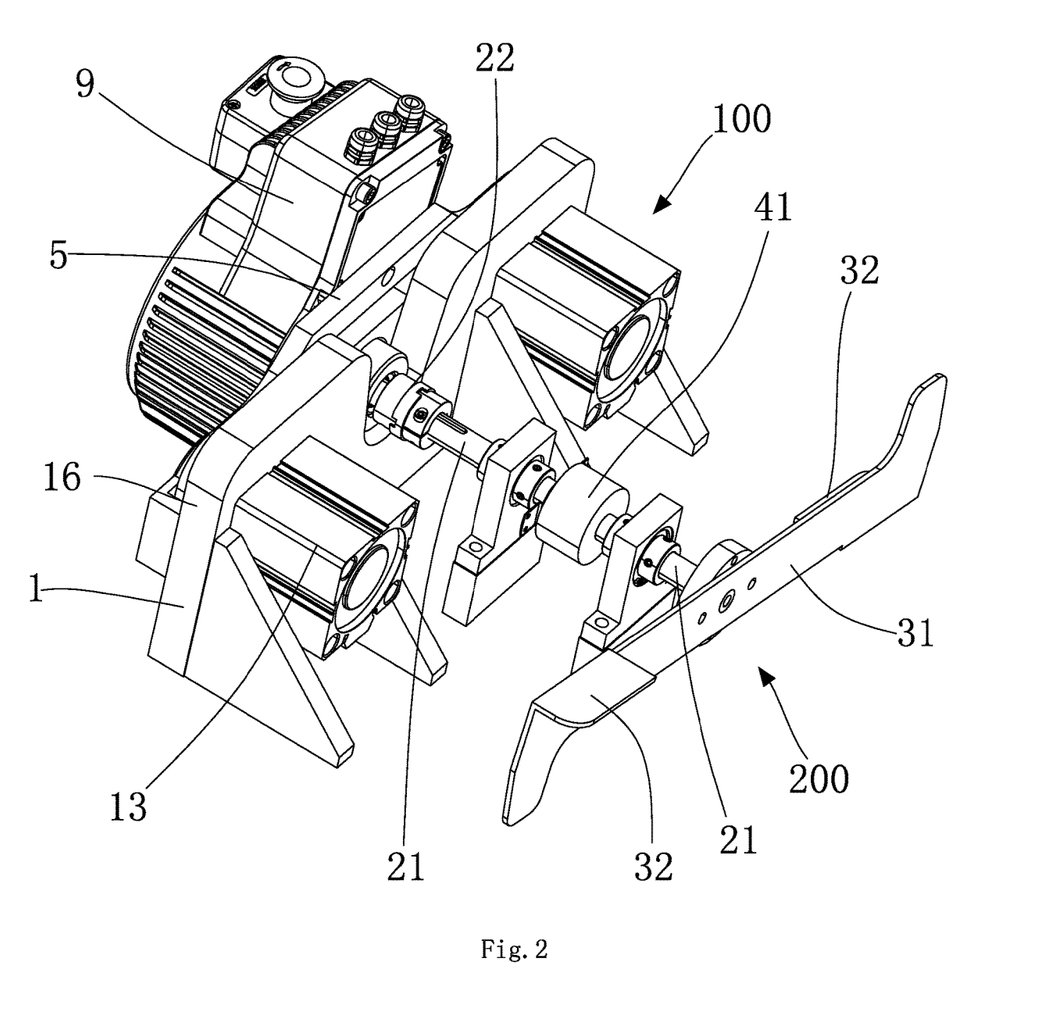
FIG. 2 is a structural diagram of a motor positioning mechanism and a linkage mechanism according to the present invention.

As shown in FIG. 2, the simulation load comprises a simulation blade 31 fixed to the linkage shaft 21 at its middle, and cover pieces 32 each forming an included angle of 90 degrees with the simulation blade 31 are provided on the simulation blade 31. The two cover pieces 32, each provided on one of front and rear sides of the simulation blade 31, are located at opposite ends of the simulation blade 31, respectively, and are provided symmetrically along an axis of the linkage shaft 21.

As shown in FIG. 2, the speed detection module comprises a rotary encoder 41 provided on the linkage shaft 21. The linkage shaft 21 is linked with the output shaft 91 of the motor 9 under test through a coupling 22.

Figure 3:
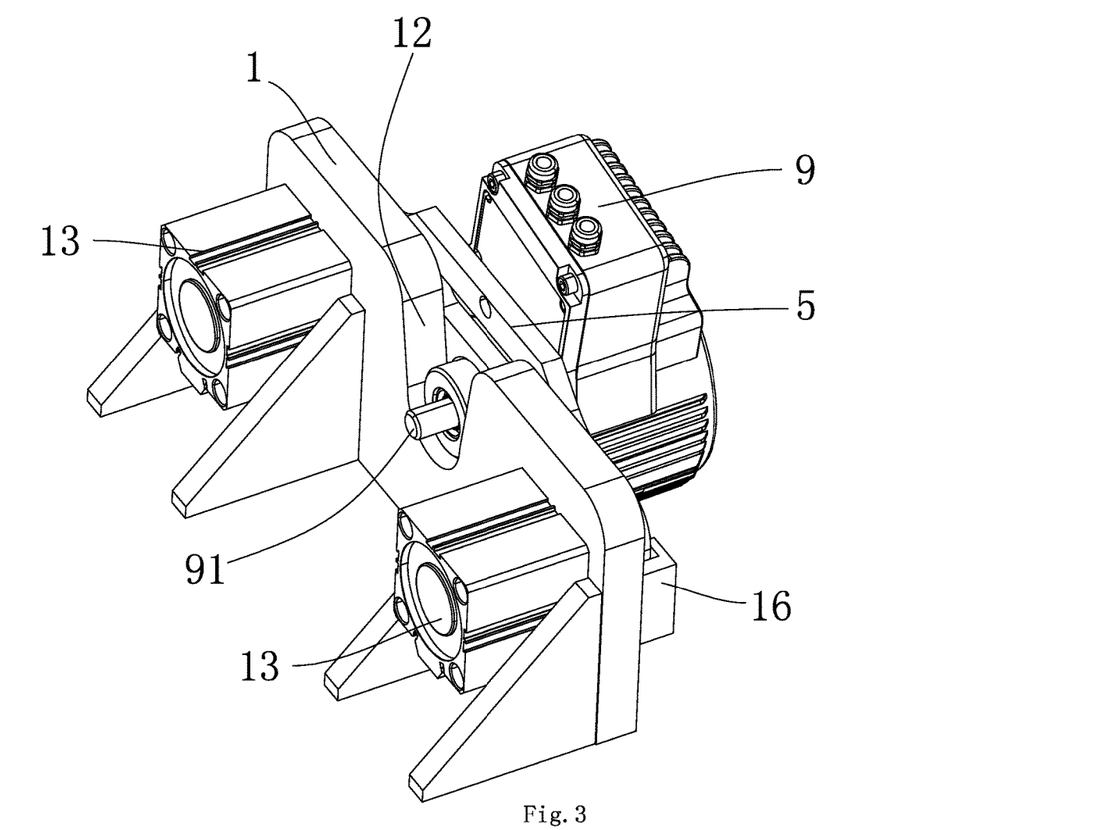
FIG. 3 is a structural diagram when a motor under test is fixed to the motor positioning mechanism according to the present invention.
Figure 4:
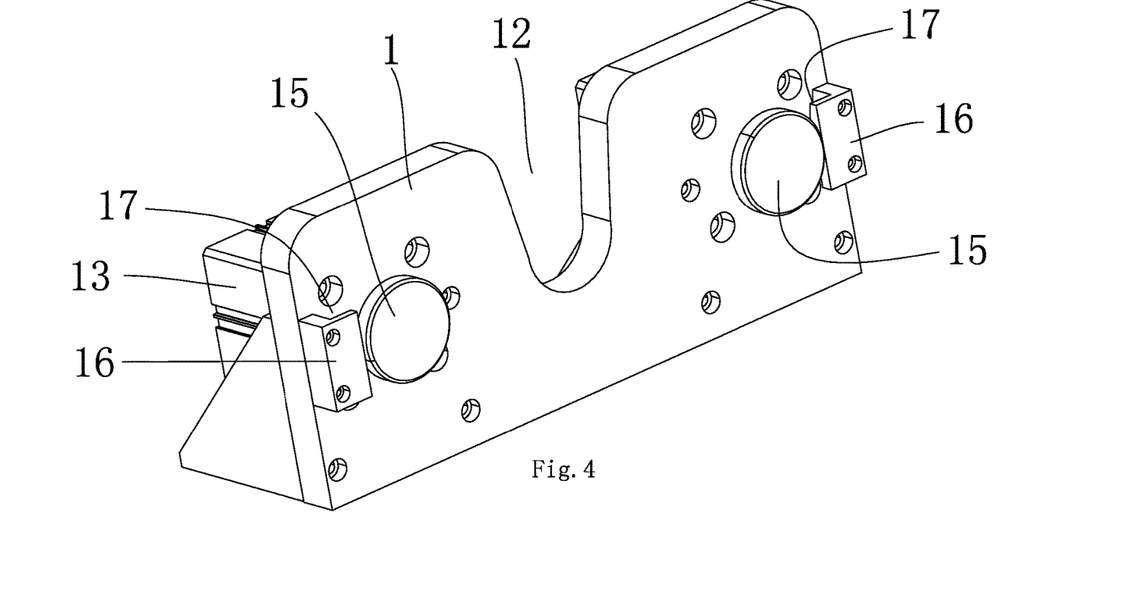
FIG. 4 is a structural diagram of the motor positioning mechanism according to the present invention.

As shown in FIGS. 2 to 4, the motor positioning mechanism 100 comprises a fixed mount 1 and a mounting plate 5. Guide grooves for shipper rods 11 to run through are provided on left and right sides of the fixed mount 1, and a recess groove 12 for receiving the output shaft 91 of the motor 9 under test is provided in the middle of the fixed mount 1. One end of the shipper rod 11 is linked with an output end of a driver 13, while the other end is fixed to a pressure plate 15, and the drivers 13 and the pressure plates 15 are fixed to front and rear sides of the fixed mount 1, respectively. Locating pieces 16 are provided on a rear side of the fixed mount 1, a retaining nest 17 running vertically is formed between the locating piece 16 and the fixed mount 1, and an opening at an upper end of the retaining nest 17 has a width gradually decreasing from top to bottom. The recess groove 12 has a width gradually increasing from bottom to top, and runs upward through fixed mount 1.

Figure 5:
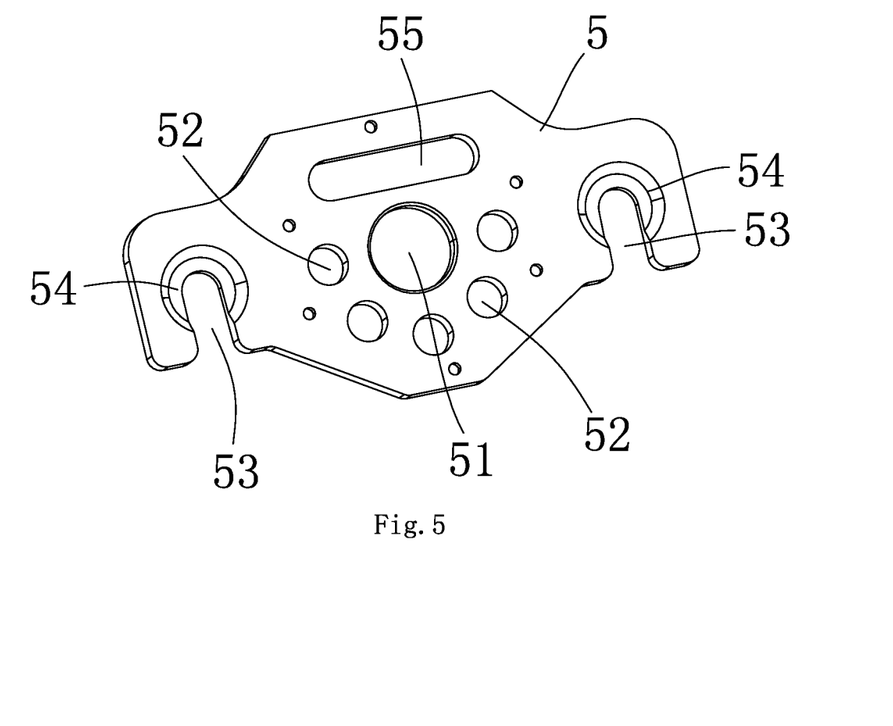
FIG. 5 is a structural diagram of a mounting plate according to the present invention.
Figure 6:
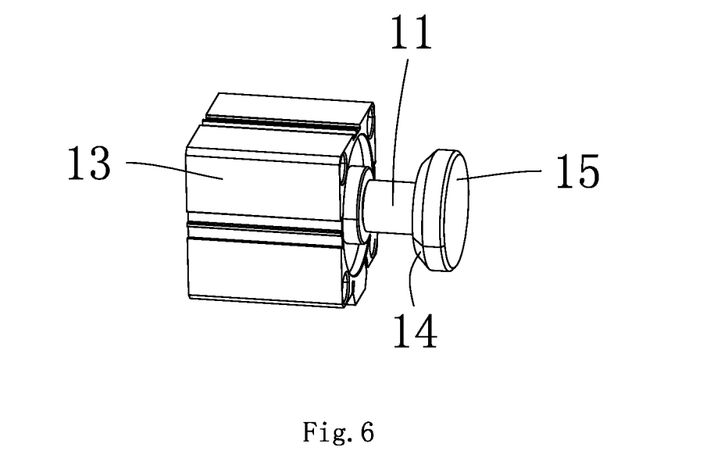
FIG. 6 is a structural diagram of a driver according to the present invention.
Figure 7:
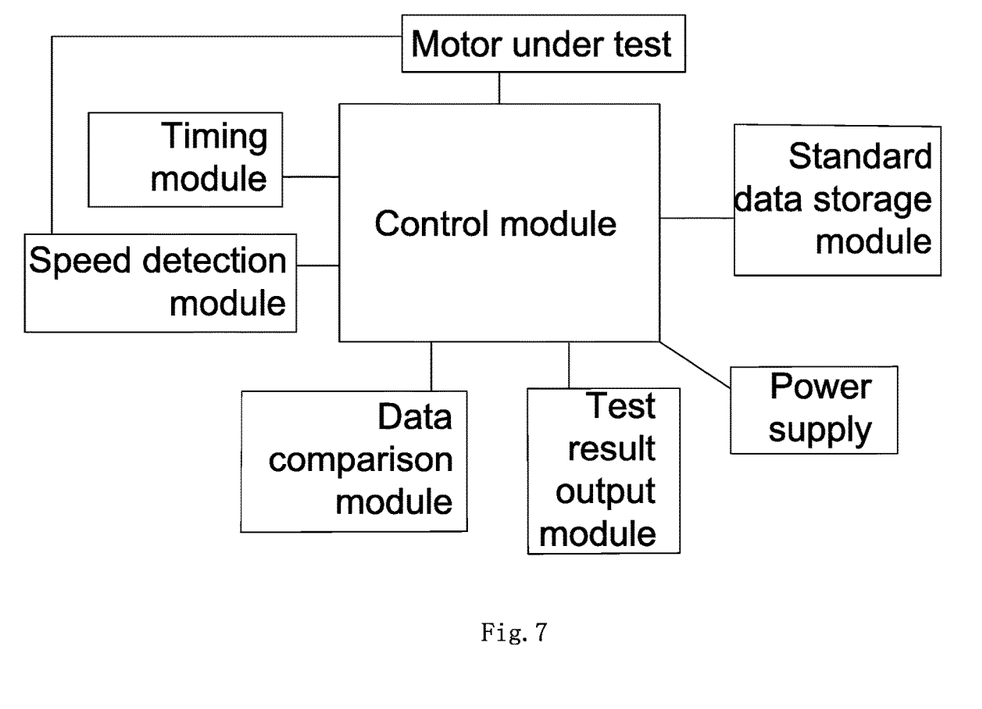
FIG. 7 is a functional block diagram according to the present invention.

As shown in FIGS. 2, 3 and 5, a pocketing groove 51 for receiving the output shaft 91 of the motor 9 under test is provided in the middle of the mounting plate 5, the mounting plate 5 is provided with mounting holes 52 which correspond to the motor 9 under test and are fitted to fasteners, and hold-down grooves 53, which open downward and are wider than the pressure plate 15, are provided on left and right sides of the mounting plate 5, respectively. A bar-type slot extending transversely runs longitudinally through an upper end of the mounting plate 5 and is located at in the middle of the mounting plate 5. As shown in FIGS. 5 and 6, the pressure plate 15 is provided with a tapered bulge 14 extending to the fixed mount 1, and the mounting plate 5 is provided with tapered open grooves 54 each fitted to the tapered bulges 14.

Figure 1:
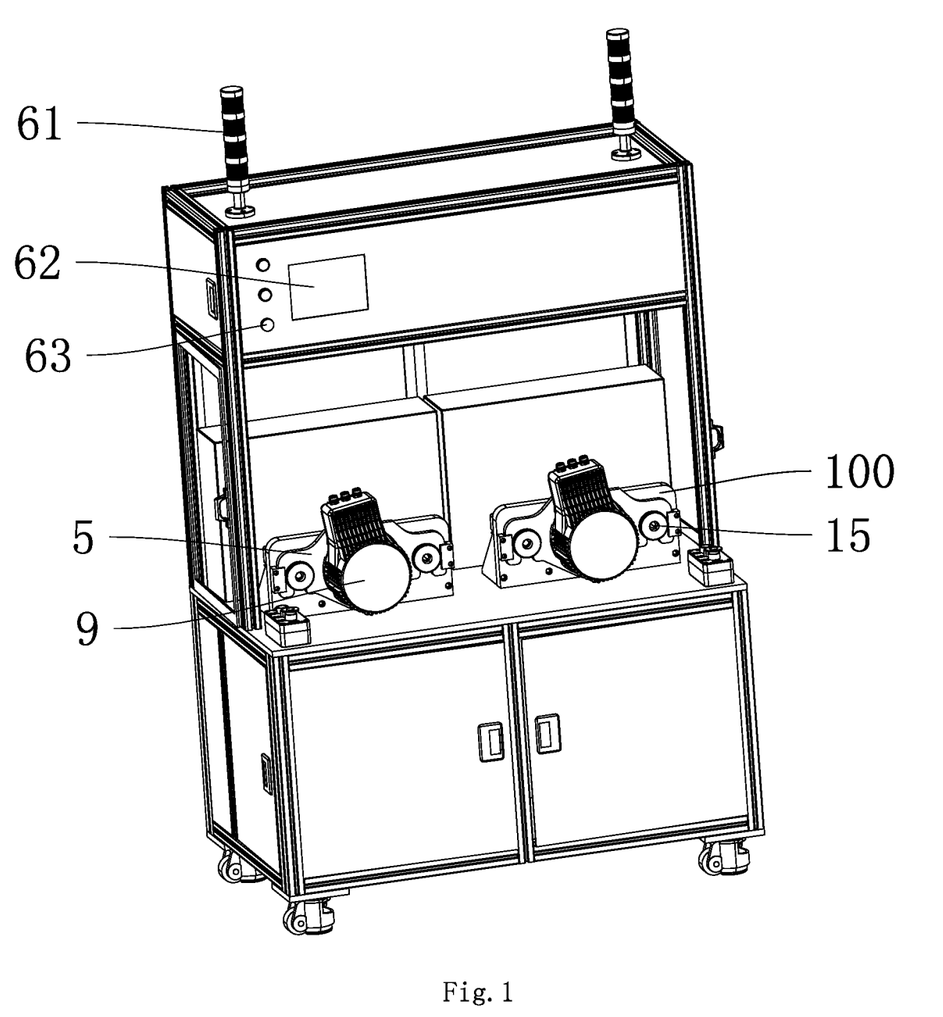
FIG. 1 is a structural diagram according to the present invention.

As shown in FIG. 1, the test result output module in this embodiment comprises alarm lights 61, the standard data storage module comprises a touch screen 62, and the control module comprises buttons 63 to control the on and off of the power. The touch screen 62 is configured to input the standard default time $T_0$, and also to display $T_1$, real-time speed, and other values.

In this embodiment, a motor braking performance testing method for the motor braking performance testing device is further disclosed, comprising following steps S1 to S4.

In the step S1, the motor under test is placed on the testing device, the output shaft of the motor under test is linked with the linkage shaft of the linkage mechanism, and the motor under test is started up by the control module.

In the step S2, when the speed of the output shaft of the motor under test reaches a rated speed, the control module sends a braking signal to control the motor to brake, and the timing module starts to count time at the same time. When the output shaft of the motor under test stops rotating completely, the timing module stops, obtains time $T_1$ from the moment when the motor under test receives the braking signal to the moment when the output shaft stops rotating completely, and transmits the time $T_1$ to the data comparison module.

In the step S3, the data comparison module compares the time $T_1$ obtained by the timing module with the standard default time $T_0$.

In the step S4, the test result output module outputs different results based on comparison results of the data comparison module, such as a result that the braking performance of the motor under test is qualified if the $T_1$ is less than the $T_0$, or a result that the braking performance of the motor under test is unqualified.

With the above method, the motor braking performance of a lawn mower is tested. The rated speed of the motor 9 under test is 3,000 rpm, and the $T_0$ is 1.5 S.

During testing, the motor 9 under test is placed on the motor positioning mechanism 100 and powered to start up by the control module with a PLC, the output shaft 91 of the motor 9 under test drives the rotary encoder 41 to rotate by the coupling 22 and the linkage shaft 21, a real-time speed can be displayed by the touch screen 62 through the functions of the rotary encoder 41 and the PLC itself. When the real-time speed reaches the rated speed, the motor 9 under test is powered off by the control module. Because of the braking function of the motor 9 under test, the output shaft 91 of the motor 9 under test stops rotating quickly. The time from the moment when the motor 9 under test receives the power-off braking signal the moment when the output shaft 91 stops rotating completely is $T_1$, which is 1.6 S. The data comparison module compares the time $T_1$ obtained by the timing module with the standard default time $T_0$. Because the $T_1$ is greater than the $T_0$, the alarm lights 61 of the test result output module light up and alarm, thus indicating that the motor braking performance is unqualified.

After the speed of the output shaft 91 of the motor 9 under test reaches the rated speed, the motor 9 under test can be set manually by a tester so that the control module automatically controls the motor 9 under test to stop operating after the motor 9 under test is started up for operation for $T_2$. The output shaft 91 of the motor 9 under test may be stopped by cutting off power, and may also be stopped by sending a standby is command and in other ways, so as to test the braking performance of the motor 9 under test. Those of skill in the art can edit the program according to the actual needs, so that the control module with the PLC can realize the above functions.

The present invention has the advantages that the device can test the braking performance of high-speed motors such as motors of lawn mowers, and make test results more accurate.

The invention claimed is:

1. A motor braking performance testing device, comprising:
   a motor positioning mechanism configured to position and fix a motor under test;
   a linkage mechanism comprising a linkage shaft for linkage with an output shaft of the motor under test and a simulation load for linkage with the linkage shaft;
   a power supply for powering the motor under test;
   a speed detection module provided on the linkage shaft for measuring the speed of the output shaft of the motor under test;

a timing module configured to count time $T_1$ from the moment when the motor under test receives a braking signal to the moment when the output shaft stops rotating completely;

a standard data storage module configured to store standard default time $T_0$ from the moment when the motor under test receives the braking signal to the moment when the output shaft stops rotating completely;

a data comparison module configured to compare the time $T_1$ obtained by the timing module with the default time $T_0$;

a test result output module which outputs different results based on comparison results of the data comparison module, such as a result that the braking performance of the motor under test is qualified if the $T_1$ is less than the $T_0$, or a result that the braking performance of the motor under test is unqualified; and a control module configured to control the start-up and braking of the motor under test, wherein the power supply, the speed detection module, the timing module, the standard data storage module, the data comparison module and the test result output module are all electrically connected to the control module.

2. The motor braking performance testing device according to claim 1, wherein the speed detection module comprises a rotary encoder provided on the linkage shaft.

3. The motor braking performance testing device according to claim 1, wherein the pressure plate is provided with a tapered bulge extending to the fixed mount, and the mounting plate is provided with tapered open grooves fitted to the tapered bulges.

4. A testing method for the motor braking performance testing device according to claim 1, comprising following steps of:

S1, placing the motor under test on the testing device, linking the output shaft of the motor under test with the linkage shaft of the linkage mechanism, and starting up the motor under test by the control module;

S2, when the speed of the output shaft of the motor under test reaches a rated speed, sending, by the control module, a braking signal to control the motor to brake, starting up the timing module to count time at the same time; when the output shaft of the motor under test stops rotating completely, stopping the timing module, obtaining, by the timing module, time $T_1$ from the moment when the motor under test receives the braking signal to the moment when the output shaft stops rotating completely, and transmitting the time $T_1$ to the data comparison module;

S3, comparing, by the data comparison module, the time $T_1$ obtained by the timing module with the standard default time $T_0$; and S4, outputting, by the test result output module, different results based on comparison results of the data comparison module, such as a result that the braking performance of the motor under test is qualified if the $T_1$ is less than the $T_0$, or a result that the braking performance of the motor under test is unqualified.

5. The motor braking performance testing device according to claim 1, wherein the simulation load comprises a simulation blade fixed to the linkage shaft at the simulation blade's middle, and cover pieces each forming an included angle with the simulation blade are provided on the simulation blade.

6. The motor braking performance testing device according to claim 5, wherein the two cover pieces, each provided on one of front and rear sides of the simulation blade, are located at opposite ends of the simulation blade, respectively, and are provided symmetrically along an axis of the linkage shaft.

7. The motor braking performance testing device according to claim 1, wherein locating pieces are provided on a rear side of the fixed mount, a retaining nest running vertically is formed between the locating piece and the fixed mount, and an opening at an upper end of the retaining nest has a width gradually decreasing from top to bottom.

8. The motor braking performance testing device according to claim 7, wherein the recess groove has a width gradually increasing from bottom to top, and runs upward through the fixed mount.

9. The motor braking performance testing device according to claim 1, wherein the motor positioning mechanism comprises a fixed mount and a mounting plate, guide grooves for shipper rods to run through are provided on left and right sides of the fixed mount, and a recess groove for receiving the output shaft of the motor under test is provided in the middle of the fixed mount; one end of the shipper rod is linked with an output end of a driver, while the other end is fixed to a pressure plate, and the drivers and the pressure plates are fixed to front and rear sides of the fixed mount, respectively; a pocketing groove for receiving the output shaft of the motor under test is provided in the middle of the mounting plate, the mounting plate is provided with mounting holes which correspond to the motor under test and are fitted to fasteners, and hold-down grooves, which open downward and are wider than the pressure plate, are provided on left and right sides of the mounting plate, respectively.

10. The motor braking performance testing device according to claim 9, wherein the recess groove has a width gradually increasing from bottom to top, and runs upward through the fixed mount.

11. The motor braking performance testing device according to claim 9, wherein a bar-type slot extending transversely runs longitudinally through an upper end of the mounting plate and is located in the middle of the mounting plate.

* * * * *